United States Patent [19]

Sumita

[11] Patent Number: 4,897,250

[45] Date of Patent: Jan. 30, 1990

[54] PROCESS FOR PRODUCING CALCIUM PHOSPHATE

[75] Inventor: Masaya Sumita, Tokyo, Japan

[73] Assignee: Asahi Kogaku Kabushiki Kaisha, Tokyo, Japan

[21] Appl. No.: 301,411

[22] Filed: Jan. 25, 1989

Related U.S. Application Data

[63] Continuation of Ser. No. 115,931, Nov. 2, 1987, abandoned.

[30] Foreign Application Priority Data

Oct. 31, 1986 [JP] Japan ................................. 61-258196

[51] Int. Cl.$^4$ ....................... C01B 15/16; C01B 25/26
[52] U.S. Cl. .................................... 423/308; 423/307; 423/309; 423/311
[58] Field of Search ................. 423/308, 309, 311, 307

[56] References Cited

U.S. PATENT DOCUMENTS

| | | | |
|---|---|---|---|
| 1,929,443 | 10/1933 | Milligan | 423/309 |
| 4,265,867 | 5/1981 | Caswell | 423/309 |
| 4,481,175 | 11/1984 | Iino et al. | 423/308 |

FOREIGN PATENT DOCUMENTS

| | | |
|---|---|---|
| 0205622 | 12/1986 | European Pat. Off. . |
| 21988 | 10/1942 | Finland . |
| 2419254 | 10/1979 | France . |
| 2537558 | 6/1984 | France . |
| 59-21509 | 2/1984 | Japan . |
| 59-217610 | 12/1984 | Japan . |
| 1586915 | 3/1981 | United Kingdom . |

*Primary Examiner*—Gregory A. Heller
*Attorney, Agent, or Firm*—Sughrue, Mion, Zinn, Macpeak & Seas

[57] ABSTRACT

A process for producing a calcium phosphate comprising the steps of (a) dissolving at least one member selected from the group consisting of calcium hydroxide and calcium oxide in water with at least one member selected from the group consisting of a sugar, a sugar alcohol, and a polyhydric alcohol; (b) and adding phosphoric acid to the solution obtained to precipitate a calcium phosphate.

11 Claims, 3 Drawing Sheets

4,897,250

PROCESS FOR PRODUCING CALCIUM PHOSPHATE

This is a continuation of application Ser. No. 115,931, filed on Nov. 2, 1987, now abandoned.

FIELD OF THE INVENTION

The present invention relates to a process for producing a calcium phosphate, and more particularly to a process for producing a calcium phosphate by reacting calcium hydroxide and phosphoric acid in an aqueous solution, that is, by a wet method.

BACKGROUND OF THE INVENTION

Calcium phosphates are now widely used as food additives, dental materials, for artificial bones, etc.

In the production of calcium phosphates, a wet method in which calcium hydroxide and phosphoric acid are reacted in an aqueous fluid is generally employed. In accordance with the wet method, calcium hydroxide or calcium oxide is added to water to prepare a suspension (hereinafter referred to as "lime milk"), and an aqueous phosphoric acid solution is added thereto dropwise and reacted with the lime milk to precipitate a calcium phosphate.

In the wet method, however, calcium hydroxide is present chiefly in solid form in the lime milk because the solubility of calcium hydroxide in water is extremely low (solubility at 20° C.: 0.126 g per 100 g of water). For this reason, even if phosphoric acid is added with vigorous stirring, it is difficult to consistently obtain a high quality product under the influences of granularity, form, and the like of solid calcium hydroxide. Moreover, during the storage of the lime milk, precipitation and solidification occur unless vigorous stirring is continuously applied For example, in the conventional wet method, since both calcium hydroxide in solid form and that in dissolved form react with phosphoric acid, unhomogeneous calcium phosphate having different diameters and properties is obtained.

Another problem is that in transporting the lime milk by means of e.g., a pump, adhesion to the pipe and solidification occur.

Thus, there has been proposed a method in which a water-soluble calcium salt such as calcium chloride or calcium nitrate, is used in place of the lime milk and is reacted with sodium phosphate, ammonium phosphate and the like in an aqueous solution to produce a calcium phosphate.

This method, however, has the disadvantage that undesirable compounds are produced as well as the desired calcium phosphate, requiring an additional step for removing the byproducts and complicating the process.

SUMMARY OF THE INVENTION

An object of the present invention is to provide a process for producing a calcium phosphate in which a high quality calcium phosphate can be obtained in a simplified manner without disadvantages such as precipitation and solidification of calcium hydroxide.

It has now been found that the above and other objects of the present invention are attained by a process for producing a calcium phosphate comprising the steps of (a) dissolving at least one member selected from the group consisting of calcium hydroxide and calucium oxide in water with at least one member selected from the group consisting of a sugar, a sugar alcohol, and a polyhydric alcohol; and (b) adding phosphoric acid to the solution obtained to precipitate a calcium phosphate.

DETAILED DESCRIPTION OF THE INVENTION

Figure 1:
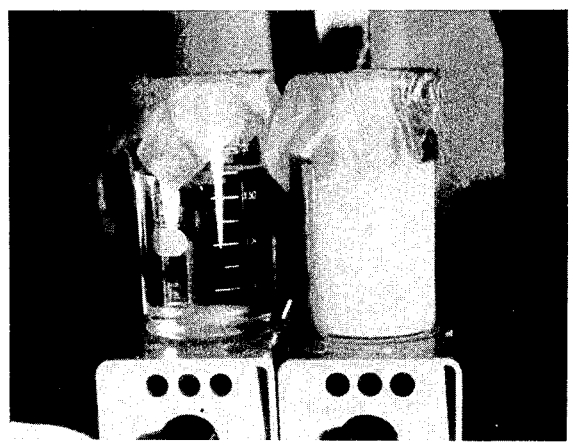
FIG. 1 is a photograph showing the state of the aqueous calcium hydroxide solution used in the Example 1 and that of the aqueous suspension of calcium hydroxide used in the Comparative Example.

According to the present invention, calcium hydroxide is dissolved in an aqueous solution containing at least one of sugars, sugar alcohols, and polyhydric alcohols, and phosphoric acid or an aqueous solution thereof is added to the resultant solution to precipitate calcium phosphate.

Addition of at least one of sugars, sugar alcohols, and polyhydric alcohols increases the solubility of calcium hydroxide in water, thereby permitting the dissolution of calcium hydroxide in water. Thus, the problem of precipitation and solidification during storage or transportation can be overcome, and handling and operation can be simplified. Moreover, since phosphoric acid is reacted with calcium hydroxide which is dissolved, calcium phosphate is precipitated in a fine particulate form and further is of high quality. Sugars, sugar alcohols, and polyhydric alcohols used to increase the solubility of calcium hydroxide in water are inexpensive, and since they are composed of only carbon, hydrogen, and oxygen, they can be removed by evaporation in the form of carbon dioxide gas and steam by heating.

The solution of calcium hydroxide in an aqueous solution containing at least one of sugars, sugar alcohols and polyhydric alcohols can be prepared, for example, by any of the following methods: (1) a method in which an aqueous solution of at least one of sugars, sugar alcohols, and polyhydric alcohols is prepared and calcium hydroxide or calcium oxide is added to and dissolved in the aqueous solution; (2) a method in which calcium hydroxide or calcium oxide is added to water to prepare lime milk and at least one of sugars, sugar alcohols, and polyhydric alcohols is added to and dissolved in the lime milk; and (3) a method in which water, at least one of sugars, sugar alcohols, and polyhydric alcohols, and calcium hydroxide or calcium oxide are mixed at the same time.

Examples of at least one of sugars, sugar alcohols, and polyhydric alcohols which can be used in the present invention include glucose, fructose, galactose, maltose, saccharose, mannose, sorbose, ribose, xylose, arabinose, lactose, sorbitol, mannitol, glycerine, erithritol, etc.

The concentration of sugars, sugar alcohols, and polyhydric alcohols in the aqueous solution is preferably 10 wt % or more. At a lower concentration of less than 10 wt %, it is relatively difficult to satisfactorily dissolve calcium hydroxide in the solution It is not necessary, however, to add the sugars, sugar alcohols, and polyhydric alcohols until the saturated concentration is attained The desired calcium phosphate can be precipitated by adding phosphoric acid to the aqueous calcium hydroxide solution and reacting them therein. In this case, it is preferred that phosphoric acid be added as an aqueous solution having a concentration of 80 wt % or less under stirring. For this operation, the phosphoric acid dropping method which is widely used in the art may be employed, or the continuous contact preparation method as disclosed in Japanese Patent Application (OPI) No. 152009/79 (the term "OPI" as used herein means a "published unexamined Japanese patent application") and British Patent Application 1,586,915A may be employed. During the addition of phosphoric acid, any of water-soluble compound, e.g., a fluoride, may be present.

The ratio of calcium hydroxide to phosphoric acid (Ca/P atomic ratio) is determined depending on the composition of the desired calcium phosphate. Examples of the desired calcium phosphate includes hydroxy apatite ($Ca_{10}(PO_4)_6(OH)_2$) (Ca/P=10/6), fluorine apatite ($Ca_{10}(PO_4)_6F_2$) (Ca/P=10/6), and tricalcium phosphate ($Ca_3(PO_4)_2$) (Ca/P=3/2).

The calcium phosphate precipitated by the reaction can be withdrawn in a powder form by any conventional techniques such as filtration, centrigual separation, and spray drying.

The calcium phosphate obtained can be used as a material for production of various products such as artificial bone and column fillers. Particularly, a high density sintered material can be prepared from the calcium phosphate obtained according to the present invention, and such a sintered material can be used as a bio-ceramics of high quality.

The present invention is described in greater detail with reference to the following examples, which are not to be construed as limiting the present invention. Unless otherwise indicated, all parts, percents, and ratios are by weight.

EXAMPLE 1

50 g of glycerine and 100 g of water were placed in a 200 ml flask and mixed to prepare 150 g of an aqueous glycerine solution. To this aqueous glycerine solution, 2 g of calcium oxide was added. Upon stirring the resultant mixture with a magnetic stirrer, a transparent solution was obtained. The state of the solution is shown in FIG. 1 on the left side.

Figure 2:
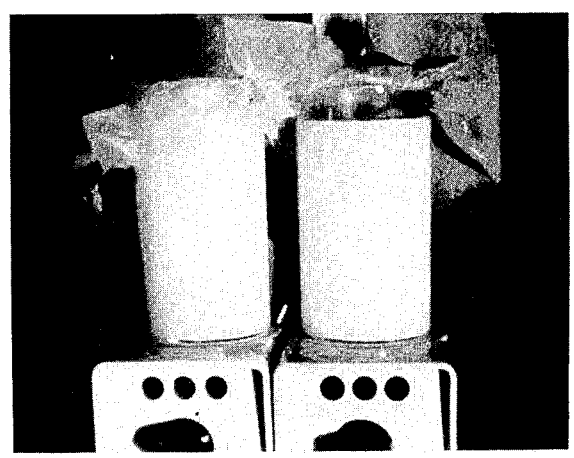
FIG. 2 is a photograph showing the state just after the stirring for precipitation of calcium phosphate through addition of phosphoric acid to the above aqueous solution and the aqueous suspension.
Figure 3:
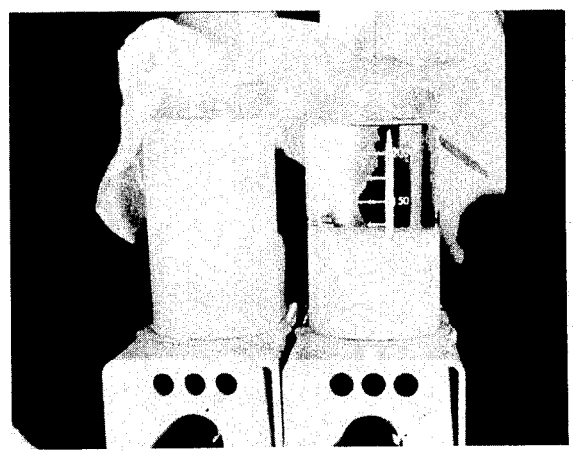
FIG. 3 is a photograph showing the state when the above calcium phosphate precipitated solution is allowed to stand for 2 minutes after stirring.

A necessary amount of a 4% aqueous phosphoric acid solution for forming hydroxy apatite (2.1 g as phosphoric acid) was added dropwise to the above aqueous solution and mixed. Then the solution became turbid and hydroxy apatite precipitated. The state of the suspension just after stirring is shown in FIG. 2 on the left side. The stirring was stopped and the suspension was allowed to stand for 2 minutes. The suspension was still turbid at this time since the precipitated hydroxy apatite is in a form of super fine particles. The state of the suspension at this time is shown in FIG. 3 on the left side. The hydroxy apatite thus precipitated was in a super fine particle form and was excellent in dispersibility, and even after standing for 2 minutes after stirring, almost no precipitation occurred.

COMPARATIVE EXAMPLE 150 g of water was placed in a 200 ml flask, and 2 g of calcium oxide was added thereto and stirred with a magnetic stirrer. The mixture became whitely turbid and lime milk was obtained. The state is shown in FIG. 1 on the right side.

A necessary amount of a 4% aqueous phosphoric acid solution for forming hydroxy apatite (2.1 g as phosphoric acid) was added to the above solution and mixed Then, the solution became turbid, and hydroxy apatite precipitated. The state of the suspension just after the stopping of stirring is shown in FIG. 2 on the right side. The state of the suspension 2 minutes after the stopping of stirring is shown in FIG. 3 on the right side. The lower half of the suspension was turbid, and the upper half of the suspension was transparent. This is because the hydroxy apatite thus precipitated is a coarse particle form, and on standing it for 2 minutes after the stopping of stirring, considerable precipitation occurred.

EXAMPLE 2

200 g of saccharose was added to 1 kg of water to prepare 1.2 kg of an aqueous saccharose solution. 34.8 g of calcium oxide was added to the above solution. Upon stirring the resulting mixture, a transparent solution was obtained.

Upon dropwise adding a necessary amount of a 4% aqueous phosphoric acid solution for forming calcium triphosphate (40.5 g as phosphoric acid) to the above solution, the mixture became turbid and calcium triphosphate precipitated.

Figure 4:
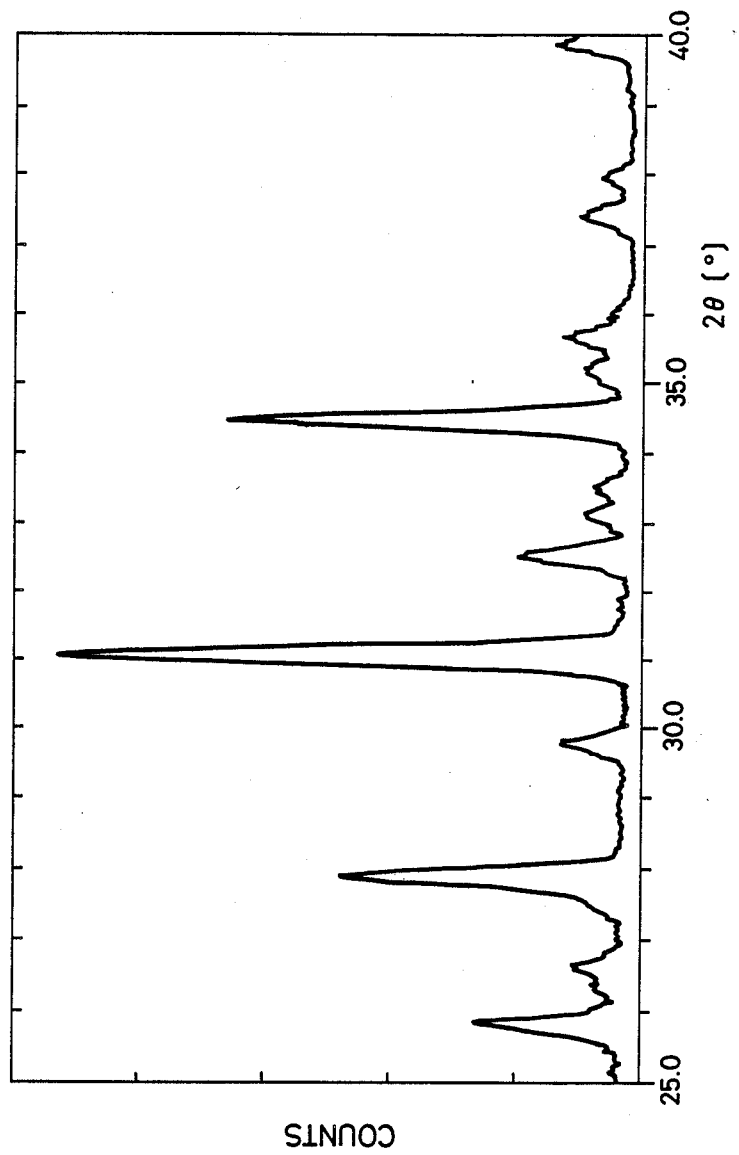
FIG. 4 is an X-ray diffraction pattern of a sintered material of calcium phosphate prepared in Example 2.

The turbid solution obtained was dried using a spray drier. The powder thus obtained was molded in a pellet form and fired at 1,100° C. to obtain a sintered material of high density. The X-ray diffraction pattern of the sintered material is shown in FIG. 4. This X-ray diffraction pattern showed that the sintered material was β-tricalcium phosphate.

In accordance with the present invention, as described above, calcium hydroxide is dissolved in an aqueous soulution containing at least one of sugars, sugar alcohols, and polyhydric alcohols, and phosphoric acid is added to the aqueous calcium hydroxide solution to precipitate calcium phosphate. Thus, there is no chance of precipitation and solidifying of calcium hydroxide during the storage and transportation, and the handling operation thereof is simplified. Moreover, in accordance with the present invention, since the desired calcium phosphate is precipitated by adding phosphoric acid to calcium hydroxide in the state of an aqueous solution, a calcium phosphate which is in a very fine particulate form and of high purity can be obtained. Furthermore, the process of production is greatly simplified.

While the invention has been described in detail and with reference to specific examples thereof, it will be apparent to one skilled in the art that various changes and modifications can be made therein without departing from the spirit and scope thereof.

What is claimed is:
1. A process for producing a calcium phosphate comprising the steps of
   (a) dissolving at least one first member selected from the group consisting of calcium hydroxide and calcium oxide in water with at least one second member selected from the group consisting of a sugar, a sugar alcohol, and a polyhydric alcohol, said at least one second member present in a total concentration effective to increase the solubility of the calcium hydroxide or calcium oxide in water;

(b) and adding phosphoric acid to the solution obtained to precipitate a calcium phosphate.

2. A process for producing a calcium phosphate as claimed in claim 1, wherein said sugar is selected from the group consisting of glucose, fructose, galactose, maltose, saccharose, mannose, sorbose, ribose, xylose, arabinose, and lactose.

3. A process for producing a calcium phosphate as claimed in claim 1, wherein said sugar alcohol is selected from the group consisting of sorbitol and mannitol.

4. A process for producing a calcium phosphate as claimed in claim 1, wherein said polyhydric alcohol is selected from the group consisting of glycerin and erythritol.

5. A process for producing a calcium phosphate as claimed in claim 1, wherein said step (a) comprises first preparing an aqueous solution of said sugar, sugar alcohol, or polyhydric alcohol, and thereafter adding said calcium hydroxide or calcium oxide 6. A process for producing a calcium phosphate as claimed in claim 1, wherein said step (a) comprises first adding said calcium hydroxide or calcium oxide to water to prepare lime milk, and thereafter adding said sugar, sugar alcohol, or polyhydric alcohol to said lime milk.

7. A process for producing a calcium phosphate as claimed in claim 1, wherein said step (a) comprises simultaneously adding said sugar, sugar alcohol, or polyhydric alcohol, and said calcium hydroxide or calcium oxide to water.

8. A process for producing a calcium phosphate as claimed in claim 1, wherein the total concentration of said sugar, sugar alcohol, or polyhydric alcohol in said solution is at least 10 wt%.

9. A process for producing a calcium phosphate as claimed in claim 1, wherein said calcium phosphate is selected from the group consisting of $Ca_{10}(PO_4)_6(OH)_2$, $Ca_{10}(PO_4)_6F_2$, and $Ca_3(PO_4)_2$.

10. A process for producing a calcium phosphate as claimed in claim 1, wherein said first member is calcium hydroxide.

11. A process for producing a calcium phosphate as claimed in claim 1, wherein said first member is calcium oxide.

* * * * *